United States Patent [19]

Hinckley et al.

[11] 3,889,486

[45] June 17, 1975

[54] REFRIGERATION SYSTEM FOR AIR CARGO CONTAINERS

[75] Inventors: Grayson W. Hinckley, Menlo Park; George Ikeda, San Francisco, both of Calif.

[73] Assignee: Pax Systems, Inc., Sunnyvale, Calif.

[22] Filed: Jan. 23, 1974

[21] Appl. No.: 435,826

Related U.S. Application Data

[63] Continuation of Ser. No. 252,267, May 11, 1972, abandoned.

[52] U.S. Cl. .................. 62/62; 62/239; 62/298; 62/326; 62/388; 220/1.5; 312/214; 312/236
[51] Int. Cl. ............................................. F25d 25/05
[58] Field of Search ....... 220/1.5; 62/239, 386, 298, 62/62, 89, 388; 312/214, 236

[56] References Cited
UNITED STATES PATENTS

| | | | |
|---|---|---|---|
| 3,335,653 | 8/1957 | Heimann | 62/239 X |
| 3,616,957 | 11/1971 | Patton | 220/1.5 |

*Primary Examiner*—William F. O'Dea
*Assistant Examiner*—Ronald C. Capossela
*Attorney, Agent, or Firm*—Limbach, Limbach & Sutton

[57] ABSTRACT

A removable refrigeration system with no moving parts for use in conjunction with an aircraft cargo container. Insulation panels line the interior surfaces of the cargo container and support each other so that no connectors between the panels and the cargo container are necessary. The panel lining the door of the cargo container is forced against the other insulation panels by the force used to close the door of the cargo container, forming an enclosed space sealed from the atmosphere. A box containing dry ice is carried in a corner of the enclosed space and is insulated from the bulk of the enclosed space. Inlet and outlet ports allow air to flow over the box. A slidable cover is provided over the outlet port to regulate the amount of air flowing around the box.

3 Claims, 10 Drawing Figures

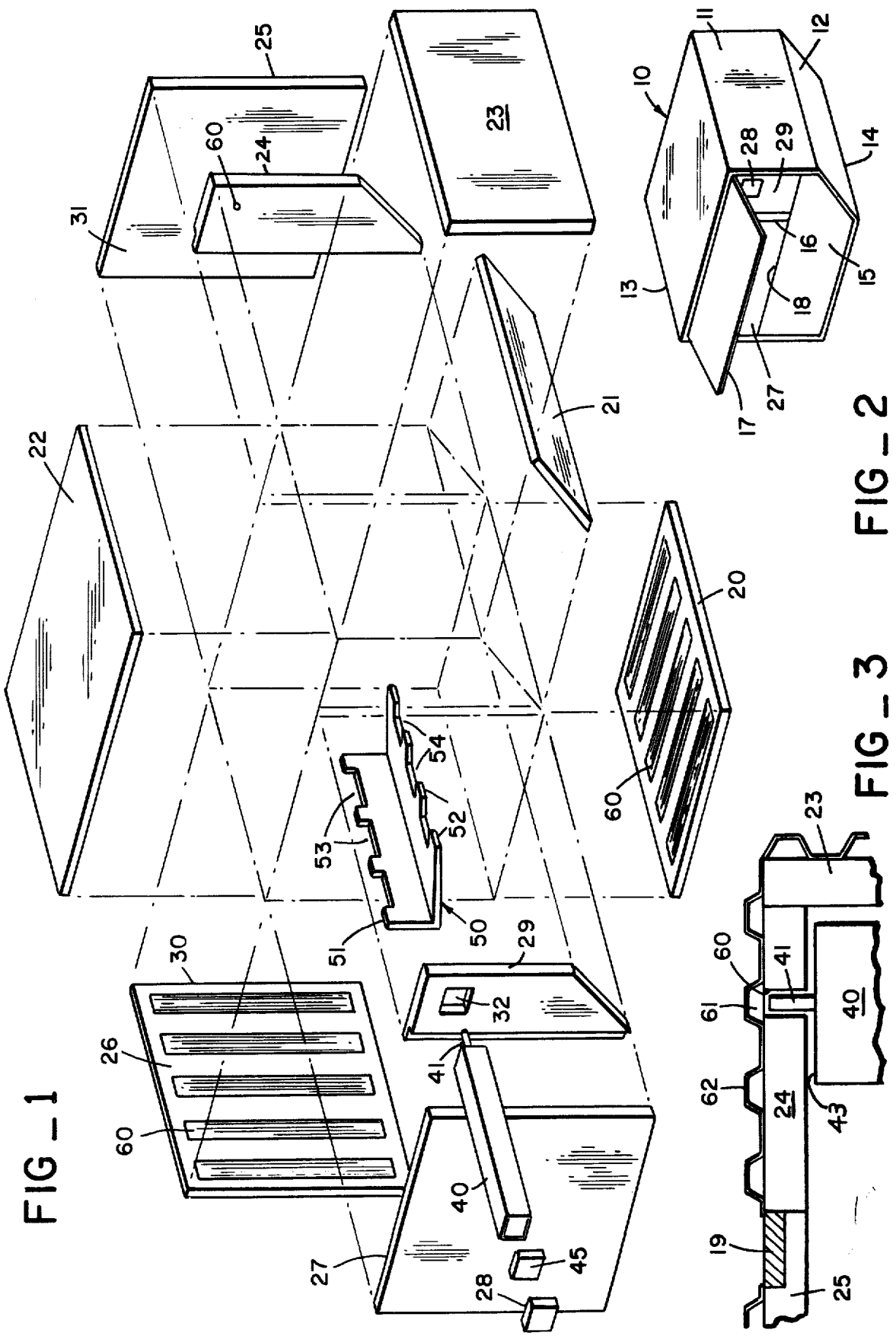

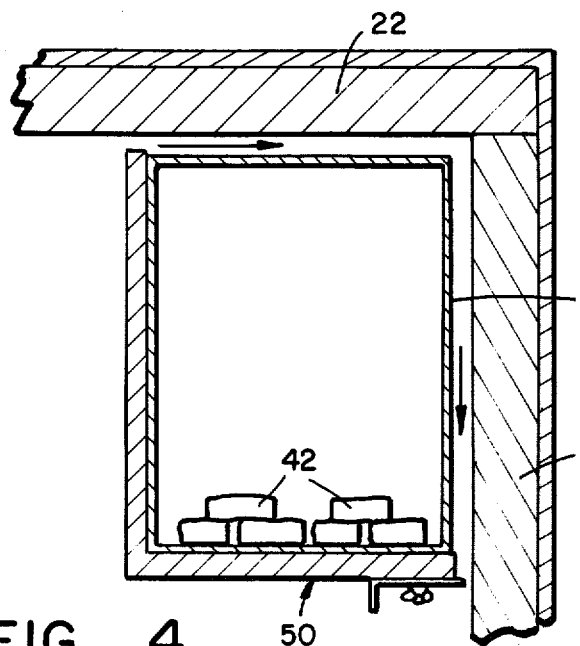
FIG_4
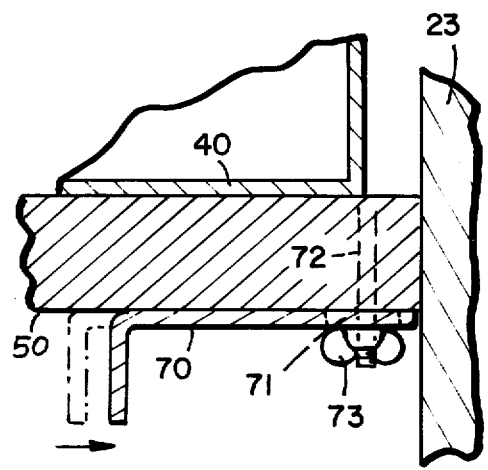
FIG_5
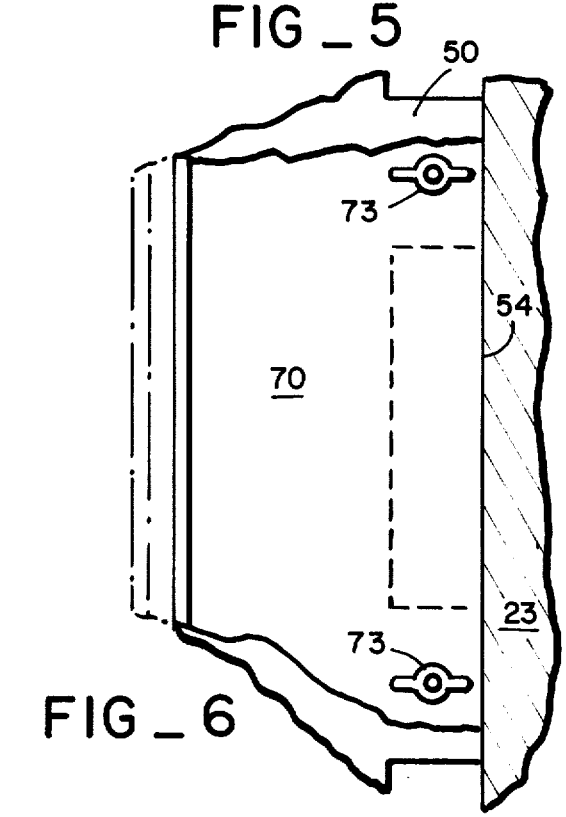
FIG_6
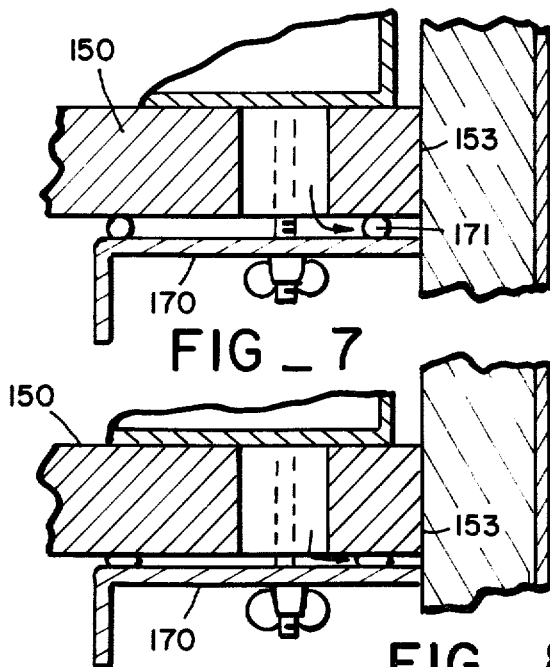
FIG_7
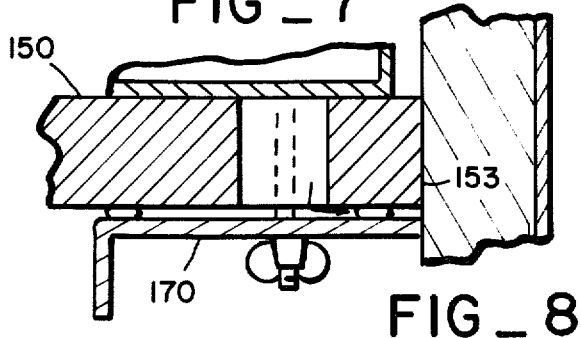
FIG_8
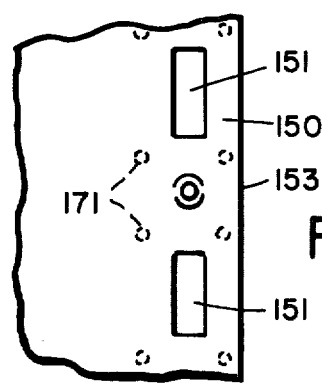
FIG_9
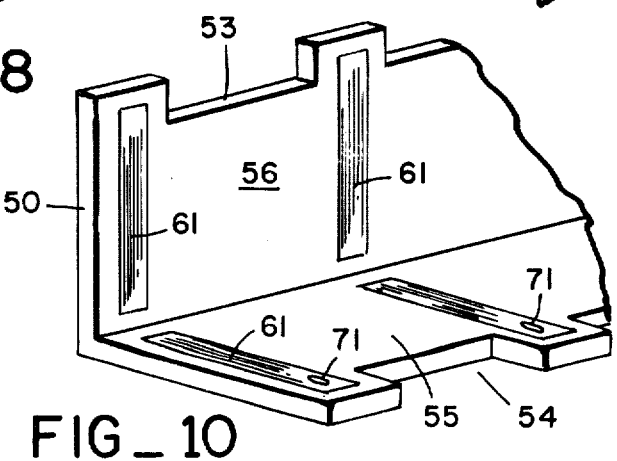
FIG_10

REFRIGERATION SYSTEM FOR AIR CARGO CONTAINERS

This is a continuation of application Ser. No. 252,267 filed May 11, 1972 now abandoned.

The invention relates generally to refrigerated cargo containers and more specifically to a removable refrigeration system which may be readily installed in a standard aircraft cargo container and which converts the standard cargo container to a highly efficient refrigerated container.

Refrigerated cargo containers have generally been containers specifically designed to carry refrigerated cargo and are typically complicated, expensive and bulky.

Refrigerated cargo containers for use in commercial aircraft must meet standards established for aircraft cargo containers in general. Refrigerated air cargo containers have heretofore typically been fabricated as an integrated unit, i.e. the container is designed soley as a refrigerated air cargo container and must be built to the exacting standards required for air cargo containers.

A primary purpose of this invention is to provide a refrigeration system which may be installed in a standard air cargo container, converting the container to an efficient refrigerated container, and which may be readily removed from the air cargo container and which does not require any alteration of the structure of the air cargo container.

A further object of this invention is to provide a simple, lightweight and inexpensive system for converting standard air cargo containers to refrigerated air cargo containers.

A further object of this invention is to provide a refrigeration system with no moving parts which can be readily installed in and removed from a standard air cargo container.

A still further object of this invention is to provide a rugged and durable refrigeration system for air cargo containers.

Other objects and advantages of the invention will become apparent from consideration of the following description of a preferred embodiment and the accompanying drawings wherein:

FIG. 1 is an exploded view of the conponents of the refrigeration system;

FIG. 2 is a perspective view of an air cargo container in which the refrigeration system is installed;

FIG. 3 is a top sectional view showing a portion of the refrigeration system and a portion of the air cargo container;

FIG. 4 is a side elevational view in section showing the box which contains dry ice and the control means for regulating air flow around the box;

FIG. 5 is a side elevational view in section, showing in greater detail the control mechanism shown in FIG. 4;

FIG. 6 is a bottom view showing the control mechanism of FIG. 5;

FIG. 7 is a side elevational view, in section, showing an alternative control means;

FIG. 8 is a side elevational view showing the control means of FIG. 7 in an alternate position;

FIG. 9 is a bottom view of a portion of the control mechanism shown in FIGS. 7 and 8; and FIG. 10 is a perspective view of a portion of the insulating means shown in FIG. 4.

FIG. 1 shows an exploded view of the basic components of the refrigeration system of this invention. The components shown in FIG. 1 are inserted into a standard air cargo container 10 shown in FIG. 2.

Referring to FIG. 1, insulation panels 20, 21, 22, 23, 24, 25, 26, 27, 28 and 29 line the interior surfaces of air cargo container 10 shown in FIG. 2. These insulation panels may be made of lightweight and durable insulation material such as polyurethane foam or polystyrene foam. The insulation panels are designed to engage at their edges in such a way that no connectors are needed to fasten the insulation panels to the air cargo container 10. The insulation panels thereby provide mutual support for each other, keeping each insulation panel firmly in place without using connectors to anchor the panels to the air cargo container 10. This mutual support may be provided in a variety of ways, several examples of which are cited hereafter. Panel 22 is supported by the top edges of panels 23 and 26. Edge 30 of panel 26 butts against face 31 of panel 25, supporting panel 25 in its upright position. Panel 26 is supported by frictional engagement of edge 30 with panel 25 and the top edge of panel 26 with panel 22. The panels together provide mutual support for each other either by frictional contact between adjacent edges or by the edge of one panel butting against a face of an adjacent panel.

The insulation panels are installed in the air cargo container 10 one at a time. Panel 23 lines the interior surface of face 11 of cargo container 10. Panel 21 conforms to the interior surface of face 12 of cargo container 10. Panel 26 conforms to the interior surface of face 13 of cargo container 10. Panel 20 conforms to the interior surface of the bottom face 14 of cargo container 10. Face 15 of cargo container 10 requires panels 27 and 29 to cover its interior surface because of a structural post 16 in this particular cargo container. The cargo container shown in FIG. 2 is referred to as LD3, and is currently a standard cargo container for use in large commercial jet aircraft such as the Boeing 747, Douglas DC 10 and Lockheed L 1011. Panel 28 covers an opening 32 in panel 29.

When the panels shown in FIG. 1 are assembled in the cargo container 10, they define an enclosed space in which refrigerated cargo may be carried. Doors 17 and 18 of cargo container 10 are used to form a seal between the insulation panels shown in FIG. 1. Panels 27, 28 and 29 extend slightly into the path of doors 17 and 18 as they close, so that pressure must be applied to fully close doors 17 and 18. This pressure forms an airtight seal along the rubber gasketed edges of the insulation panels and seals and insulates the enclosed space from the surrounding atmosphere.

Insulating means 50 is carried by panels 24 and 29 and insulates box 40 relative to the remainder of the enclosed space. Edges 51 and 52 butt against panels 22 and 23 respectively. Notches 53 serve as inlet ports, allowing air from the enclosed space to flow into the region of box 40. Notches 54 form outlet ports through which refrigerated air passes. Thus, warm air rising along panel 26 and flowing across panel 22 passes through inlet ports 53, around the surface of box 40, and through outlet ports 54.

To enhance the circulation of air, wooden strips 60 are mounted on the insulation panels. Wooden strips 60 allow air to pass beneath the cargo and along the interior surfaces of panels 20, 21, 22, 23, and 26.

Wooden strips on panels 20, 21, 22, 23, and 26 are parallel to each other so that circulation of air flow through inlet ports 53 and outlet ports 54 is enhanced. Wooden strips 60 also provide protection for the insulation panels.

FIG. 3 shows the manner in which box 40 is vented to the surrounding atmosphere. An exhaust pipe 41 extends from box 40 through a hole 60 defined in panel 24 and allows evaporated carbon dioxide to escape into the region 61 between panel 24 and the corrugated metal surface 62 of air cargo container 10. The surface of pipe 41 forms a leakproof seal with the hole 60, and face 43 of box 40 forms a seal with panel 24, thereby preventing the release of evaporated carbon dioxide into the cargo area, which might otherwise cause spoilage. From there, the carbon dioxide escapes into the surrounding atmosphere through openings in the surface of cargo container 10. Post 19 is a portion of air cargo container 10, similar to member 16.

FIG. 4 shows box 40 containing dry ice 42 and covered by insulating means 50. The supply of dry ice may be replenished by opening door 17 of air cargo container 10, removing panel 28, and removing door 45, which allows direct access to the interior of box 40.

FIG. 10 shows in closer detail a portion of insulating means 50. Wooden strips 61 lines faces 55 and 56 and are oriented in a direction parallel with wooden strips 60. Warm air flowing through inlet port 53 flows partially along face 56 of insulating means 50, thence along the surface of face 55 of insulating means 50 and through outlet port 54. Warm air passing through port 53 also partially flows along the path of the arrows shown in FIG. 4 between box 40 and panel 23 and between box 40 and panel 22. In this manner the entire surface of box 40 is exposed to the flow path of the circulating air as it flows from inlet port 53 to outlet port 54.

FIGS. 5 and 6 show the control means for regulating the amount of air flowing through outlet ports 54. A slidable cover 70, which extends the length of edge 52 (FIG. 1), is used to regulate the size of the opening of port 54. Cover 70 has a plurality of slots 71 through which studs 72, attached to box 40, extend. Wing nuts 73 secure cover 70 to insulating means 50. To maximize the capacity of the refrigeration system, cover 70 in FIG. 5 is moved to the left, as shown in phantom, uncovering port 54. To reduce the operating capacity of the system, port 54 is restricted by loosening wing nut 73 and sliding cover 70 toward panel 23, as shown in FIGS. 5 and 6.

An alternate control means is shown in FIGS. 7, 8 and 9. In this embodiment insulating means 150 has a straight edge 153 as shown in FIG. 9. Rectangular ports 151 are cut into the insulating means and define outlet ports. Rubber pads 171 are used as spacers. As wing nut 173 is tightened, the distance between insulating means 150 and cover 170 decreases, thereby restricting the flow through outlet port 151 and reducing the operating capacity of the system.

Thus, an extremely simple, rugged, efficient and inexpensive system is provided to help meet the needs of the air cargo industry. No moving parts are used. The system can be installed and removed by technicians with very little training. The insulation panels add significantly to the structural strength of the air cargo container. By recirculating the air within the enclosed space, efficiency is maximized, since the system does not have to continually cool air from ambient temperatures. The simplicity of the system reduces manufacturing costs.

We claim:

1. A method of transporting perishable cargo in an enclosed air cargo container having an access door comprising the steps of removably lining the interior walls and the access door of the air cargo container with rigid insulation panels which mutually support each other and which together define an enclosed space for containing the cargo;

lining those of the insulation panels against which the cargo will rest with raised slats to provide a flowpath for refrigerated air around the cargo;

refrigerating the enclosed space by installing a box adjacent the top of the enclosed space, insulating the box on at least two sides facing the enclosed space, and placing a frozen coolant within the box; and forcibly closing the access door against the resistance of the insulating panels to cause them to seal against each other.

2. A method of transporting perishable cargo as recited in claim 1 further comprising the step of controlling the degree of refrigeration by controlling the flow of air within the enclosed space over the uninsulated surfaces of the box containing the coolent material.

3. A method of transporting perishable cargo as recited in claim 1 wherein the step of refrigerating the enclosed space comprises placing a frozen gas in the box and venting the gas as it evaporates entirely and directly to the exterior of the cargo container.

* * * * *